W. A. JEX.
DIFFERENTIAL MECHANISM.
APPLICATION FILED JULY 3, 1919.

1,366,805.

Patented Jan. 25, 1921.
2 SHEETS—SHEET 1.

Witness
Evans D. Haines

Inventor
William A. Jex
By H. B. Willson & Co.
Attorneys

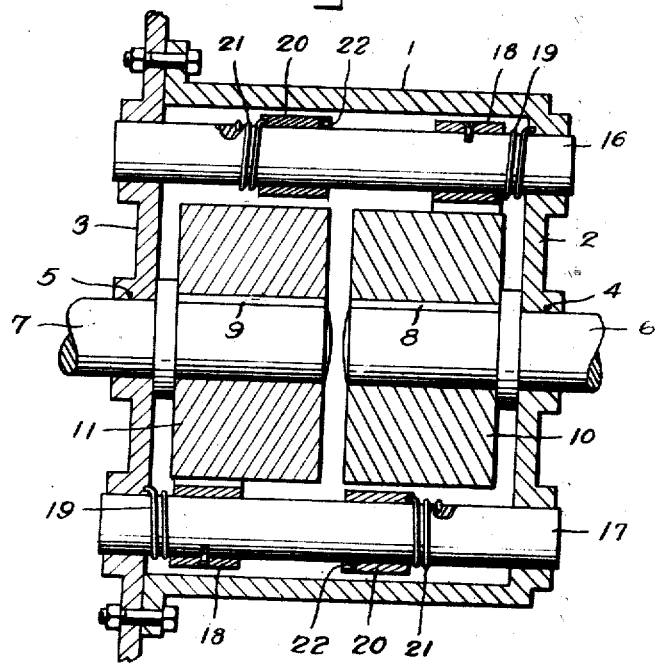
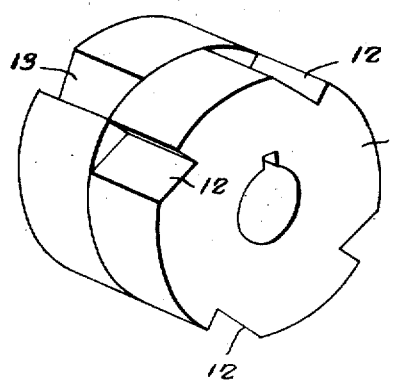
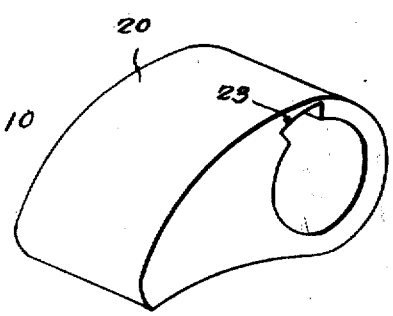

UNITED STATES PATENT OFFICE.

WILLIAM A. JEX, OF ROCHESTER, NEW YORK.

DIFFERENTIAL MECHANISM.

1,366,805.   Specification of Letters Patent.   Patented Jan. 25, 1921.

Application filed July 3, 1919. Serial No. 308,353.

*To all whom it may concern:*

Be it known that I, WILLIAM A. JEX, a citizen of the United States, residing at Rochester, in the county of Monroe and State of New York, have invented certain new and useful Improvements in Differential Mechanisms; and I do declare the following to be a full, clear, and exact description of the invention, such as will enable others skilled in the art to which it appertains to make and use the same.

This invention relates generally to transmission apparatus, and more particularly to a differential mechanism for the propulsion of motor vehicles.

The primary object of the invention is to provide a differential mechanism in which a braking action is effected upon one of the driven members when the other driven member is running ahead of the driving member as when the vehicle is making a turn, and thereby utilize all of the power for effective traction purposes.

Another object of the invention is to generally improve upon differential mechanisms by the provision of a comparatively simple, strong, durable and inexpensive construction, and one which will be efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings in which the preferred form of the invention is illustrated, and in which similar reference characters designate like parts throughout the several views;

Fig. 3 is a central vertical longitudinal sectional view through the apparatus.

Fig. 4 is a perspective view of the ratchets, and

Fig. 5 is a similar view of one of the pawls.

Figure 1:
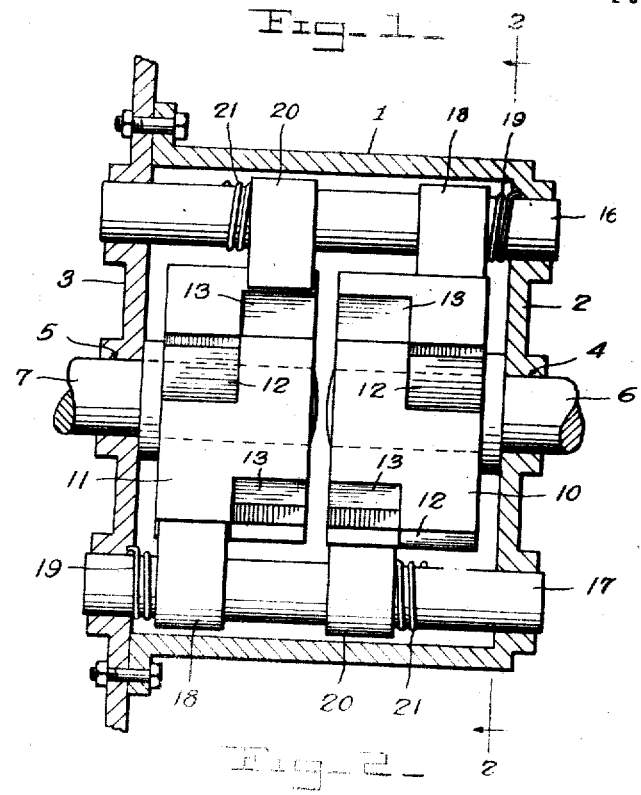
Figure 1 is a longitudinal sectional view through the hollow driving member, showing the parts disposed therein in elevation.

Referring more particularly to the drawings, the numeral 1 designates a hollow cylindrical casing having an integrally formed wall 2 at one end and a detachable plate 3 at its other end. The casing 1 and the plate 3 comprise a driving member which may be driven from the engine of a motor vehicle in any suitable manner. As this forms no part of the present invention, no means for driving the driving member is shown.

The wall 2 of the casing 1 and the plates 3 are provided with alined contrally disposed bearings 4 and 5 respectively and in these bearings are journaled the driven axle sections 6 and 7. These axle sections 6 and 7 have their inner ends disposed adjacent each other within the casing 1 while their outer ends are intended to carry the driving wheels for the vehicle. The portions of the axles 6 and 7 which extend into the casing 1 are provided with suitable keys 8 and 9 by which the ratchets 10 and 11 are mounted upon the axles to rotate with the same. As clearly shown in the drawings, these ratchets 10 and 11 are provided on their peripheries with sets of oppositely formed notches 12 and 13.

Journaled in bearings 14 and 15 in the wall 2 of the casing 1 and the plate 3 and disposed upon diammetrically opposite sides of the axles 6 and 7 are rock shafts 16 and 17, which have suitably fixed or keyed thereto pawls 18. These pawls 18 extend in the same direction relative to the rotation of the driving member and engage corresponding notches in the ratchets 10 and 11 so as to drive said ratchets and consequently the axles 6 and 7 in the same direction. Coil springs 19 having one of their ends anchored to the casing 1 and their other ends to the shafts 16 and 17 serve to yieldably hold said shafts in such a position tht the pawls 18 are normally in engagement with the notches in their respective ratchets.

The shafts 16 and 17 also carry pawls 20 which are disposed opposite the remaining notches in the ratchets 10 and 11. The pawls 20 instead of being fixed rigidly to the shafts 16 and 17 have a slidable mounting thereon, this mounting being affected by coil springs 21 which are connected at their ends to the shafts 16 and 17 and to said pawls, and pins 22 projecting from the shafts into recesses 23 arranged in the pawls. As clearly shown in Fig. 2 of the drawings, the pawls 18 and 20 carried by the rock shafts 16 and 17 extend in opposite directions and are positioned so that while the pawls 18 are disposed in the notches 12, the pawls 20 will be out of engagement with the notches 13 and riding upon the peripheries of the ratchets.

Figure 2:
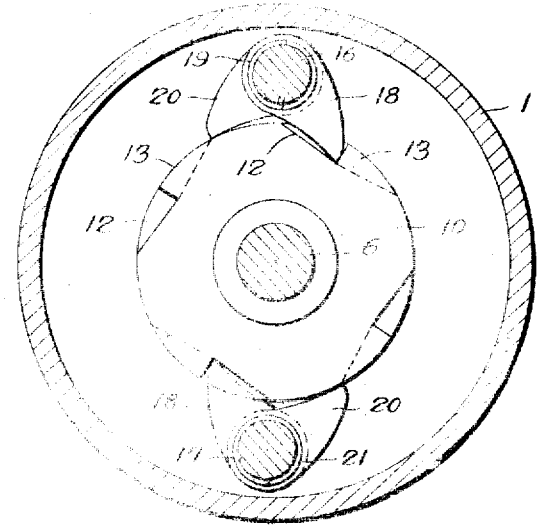
Fig. 2 is a transverse sectional view taken substantially on the plane indicated by the line 2—2 of Fig. 1.

In operation, if the driving member or casing 1 is rotating in a clockwise direction referring to Fig. 2 of the drawings, the pawls 18 will be in engagement with the notches 12 and rotary motion will thereby be imparted to the ratchets and to the driving axles 6 and 7. If the vehicle is to make a turn so that the wheel carried by the axle 6 will have the greatest distance to travel, the ratchet 10 will rotate ahead of the casing 1. This will necessarily cause the pawl 18 which engages the ratchet 10 to ride on the periphery of the ratchet and rock the rock shaft 16 so as to move pawl 20 carried thereby relative to ratchet 11 until it projects into one of the notches 13 therein. This effects a braking action upon the ratchet 11 and the driving axle 7 so that these parts cannot rotate ahead of the casing 1. As soon as the vehicle has made the turn and both wheels are traveling at the same rate of speed, the pawl 20 carried by the shaft 16 will become disengaged from the notch 13 in the ratchet 11 and the pawl 18 will engage one of the notches 12 in the ratchet 10, thereby insuring equal traction upon both driving wheels.

In case one of the driving wheels of the vehicle engages a mud hole or soft place in the road as the vehicle is going straight ahead and this wheel starts to race, the aforementioned braking action will be effected upon the other driving wheel so that all the tractive power will be applied to the latter until the vehicle passes through the mud hole.

When the vehicle is backing, the casing 1 will necessarily be rotated in a reverse direction from that heretofore explained and the pawls 20 will be in engagement with the notches 13 of the ratchets 10 and 11. Should the vehicle make a turn while running backward or should one of the driving wheels strike a soft place so as to cause it to rotate ahead of the driving member, the other driving wheel will be locked against rotating faster than said driving members.

From the foregoing description, taken in connection with the accompanying drawings, it will be seen that the objects of the invention have been effectively carried out. However as various changes in form, proportion, and in the minor details of construction may be resorted to without departing from the spirit of the invention, it is to be understood that I do not wish to be limited to the exact construction herein shown and described.

I claim:

1. A differential mechanism including a rotatable driving member, a pair of rotatable driven members, driving means carried by said driving member and engageable with said driven members to drive said driven members in one direction, and driving means carried by said driving member engageable with said driven members to drive said driven members in the other direction, the two said means being arranged and operatively connected so that when one driven member is rotating faster than said driving member one of said driving means will retain driving engagement with the other driven member and the other driving means will be moved into engagement with the other driven member so as to prevent the latter from rotating faster than said driving member.

2. A differential mechanism including a rotatable driving member, a pair of rotatable driven members, driving means carried by said driving member and engageable with said driven members to drive one driven member in one direction and the other driven member in the other direction, and additional driving means carried by said driving member and engageable with said driven members to drive one driven member in one direction and the other driven member in the other direction, the two said driving means being arranged to drive said driven members in opposite directions and being operative independently of each other, whereby to cause power to be supplied to one of said driven members while the other driven member is rotating faster than the driving member and to simultaneously prevent the first driven member from moving faster than said driving member.

3. A differential mechanism including a rotatable driving member, a pair of rotatable driven members each carrying oppositely formed ratchets, a pair of rock shafts carried by said driving member, and a pair of oppositely extending pawls carried by each of said rock shafts, one pawl of each shaft being engageable with a ratchet of one of said driven members and the other being engageable with the oppositely formed ratchet of the other driven member, the pawls of each pair being positioned upon their shafts so that when one disengages its ratchet the other will engage its ratchet, whereby when one driven member is rotating ahead of said driving member a braking action will be effected on the other driven member.

4. A differential mechanism including a rotatable driving member, a pair of rotatable driven members, each carrying oppositely formed ratchets, a pair of rock shafts journaled to said driving member, pawls fixed to said shafts and engageable with corresponding ratchets on said driven members, means for yieldably holding said pawls in engagement with their respective ratchets, and additional pawls yieldably mounted upon said shafts and adapted to engage the remaining oppositely formed ratchets on said driven members, the pawls on each shaft being positioned so that when one disengages its ratchet the other will engage its ratchet, whereby when one driven member is rotating ahead of said driving member a braking action will be effected on the other driven member.

In testimony whereof I have hereunto set my hand.

WILLIAM A. JEX.